(12) United States Patent
Ou et al.

(10) Patent No.: US 10,353,244 B2
(45) Date of Patent: Jul. 16, 2019

(54) EDGE-LIT BACKLIGHT MODULE AND LIQUID CRYSTAL DISPLAY DEVICE

(71) Applicants: QINGDAO HISENSE ELECTRONICS CO., LTD., Qingdao (CN); HISENSE INTERNATIONAL CO., LTD., Qingdao (CN); HISENSE USA CORPORATION, Suwanee, GA (US)

(72) Inventors: Kejian Ou, Qingdao (CN); Dengyin Zhang, Qingdao (CN); Xiping Wen, Qingdao (CN); Yao Xu, Qingdao (CN)

(73) Assignees: QINGDAO HISENSE ELECTRONICS CO., LTD., Shandong (CN); HISENSE INTERNATIONAL CO., LTD., Shandong (CN); HISENSE USA CORPORATION GA (US)

( * ) Notice: Subject to any disclaimer, the term of this patent is extended or adjusted under 35 U.S.C. 154(b) by 0 days.

(21) Appl. No.: 15/890,291

(22) Filed: Feb. 6, 2018

(65) Prior Publication Data

US 2018/0356687 A1    Dec. 13, 2018

(30) Foreign Application Priority Data

Jun. 13, 2017 (CN) .......................... 2017 1 0442074

(51) Int. Cl.
  *G02F 1/1335* (2006.01)
  *F21V 8/00* (2006.01)
  *F21V 19/00* (2006.01)

(52) U.S. Cl.
  CPC ..... *G02F 1/133615* (2013.01); *G02B 6/0021* (2013.01); *G02B 6/0031* (2013.01);
  (Continued)

(58) Field of Classification Search
  CPC .... F21V 7/22; F21V 19/005; G02F 1/133615; G02F 1/133608; G02F 2202/28;
  (Continued)

(56) References Cited

U.S. PATENT DOCUMENTS

| 2007/0115690 A1 | 5/2007 | Yue ............................. 362/627 |
| 2012/0147627 A1* | 6/2012 | Pan ..................... G02B 6/0051 362/624 |

(Continued)

FOREIGN PATENT DOCUMENTS

| CN | 203336480 U | 12/2013 |
| CN | 103818131 A | 5/2014 |

(Continued)

OTHER PUBLICATIONS

The Chinese International Search Report of corresponding international PCT application No. PCT/CN2018/075456, dated Apr. 27, 2018.

(Continued)

*Primary Examiner* — Charles S Chang

(74) *Attorney, Agent, or Firm* — J.C. Patents

(57) ABSTRACT

This present disclosure relates to the field of display technologies and provides an edge-lit backlight module and a liquid crystal display device. The edge-lit backlight module of the present disclosure includes a light source, a light guide panel and a reflector. The light source is arranged on a light entering side of the light guide panel, and the reflector is arranged below the light guide panel, a bottom surface of the light guide panel faces towards the reflector, and a plurality of dots are arranged on the bottom surface at intervals. The reflector is bonded on the bottom surface of the light guide panel through a glue layer, and the glue layer is provided with light transmission holes at positions of the dots.

19 Claims, 3 Drawing Sheets

(52) U.S. Cl.
CPC ......... *G02B 6/0043* (2013.01); *G02B 6/0058* (2013.01); *G02F 1/133608* (2013.01); *B32B 2307/412* (2013.01); *F21V 19/005* (2013.01); *G02B 6/0036* (2013.01); *G02F 2202/28* (2013.01)

(58) Field of Classification Search
CPC .. G02B 6/0021; G02B 6/0031; G02B 6/0043; G02B 6/0058; G02B 6/0036; B32B 2307/412
USPC .......................................................... 349/65
See application file for complete search history.

(56) References Cited

U.S. PATENT DOCUMENTS

2013/0100704 A1\* 4/2013 Kykta ..................... B05D 5/06
362/627
2017/0227705 A1\* 8/2017 Araki ..................... G02B 6/002

FOREIGN PATENT DOCUMENTS

| CN | 105676536 A | 6/2016 |
| CN | 205880449 U | 1/2017 |
| CN | 107065309 A | 8/2017 |

OTHER PUBLICATIONS

The Chinese First Examination Report of corresponding China patent application No. 201710442074.4, dated Jun. 28, 2018.

\* cited by examiner

EDGE-LIT BACKLIGHT MODULE AND LIQUID CRYSTAL DISPLAY DEVICE

CROSS-REFERENCE TO RELATED APPLICATION

This present disclosure claims priority to Chinese Patent Application No. 201710442074.4, filed on Jun. 13, 2017, and entitled "Backlight Module and Liquid Crystal Display Device", the content of which is incorporated herein by reference in its entirety.

TECHNICAL FIELD

This present disclosure relates to the field of display technologies, in particular, to an edge-lit backlight module and a liquid crystal display device.

BACKGROUND

The information disclosed in the back ground is related art of the present disclosure, but not necessarily constitutes prior art.

At present, ultra-thin and lightweight has become the trend in the development of liquid crystal display devices. Many improvements have been made by major manufacturers on structures and assembling solutions of various elements to obtain ultra-thin and lightweight liquid crystal display devices.

Hence, edge-lit backlight modules which render thickness of products thinner are widely used in the liquid crystal display devices.

SUMMARY

A first aspect of the present disclosure provides an edge-lit backlight module which includes a light source, a light guide panel and a reflector. The light source is arranged on a light entering side of the light guide panel, and the reflector is arranged below the light guide panel. A bottom surface of the light guide panel faces towards the reflector, and a plurality of dots are arranged on the bottom surface at intervals. A glue layer is arranged between the reflector and the light guide panel, and the glue layer is provided with light transmission holes at positions of the dots.

A second aspect of the present disclosure provides a liquid crystal display device which includes a liquid crystal panel and an edge-lit backlight module. The edge-lit backlight module is configured to illuminate the liquid crystal panel. The edge-lit backlight module includes a light source, a light guide panel and a reflector. The light source is arranged on a light entering side of the light guide panel, the reflector is arranged below the light guide panel. A bottom surface of the light guide panel faces towards the reflector, and a plurality of dots are arranged on the bottom surface at intervals. A glue layer is arranged between the reflector and the light guide panel, and the glue layer is provided with light transmission holes at positions of the dots.

BRIEF DESCRIPTION OF DRAWINGS

In order to illustrate the technical solutions of some embodiments of the present disclosure more clearly, the drawings required to be used in the description of the embodiments will be briefly described below. Apparently, the drawings described below are only some embodiments of the present disclosure, but not all implementations. For those skilled in the art, other drawings can be also obtained from these drawings without inventive labor.

Figure 1:
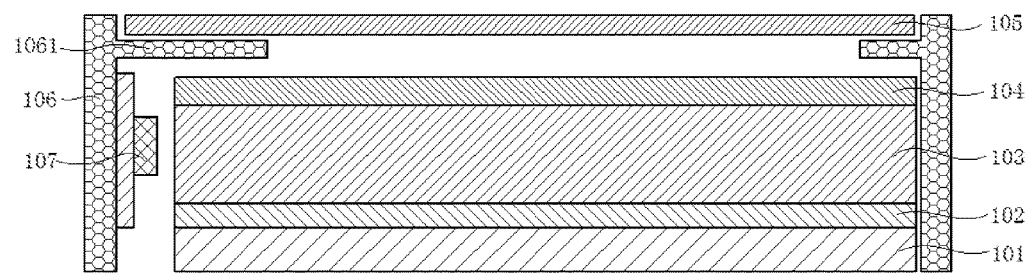
FIG. 1 is a structural diagram of a backlight module in the related art.

Through the above drawings, an explicit embodiment of the present disclosure has been shown and will be described in more detail below. These drawings and textual descriptions are not intended to limit the scope of the concept of the present disclosure in any way, but to illustrate the concepts of the present disclosure for those skilled in the art by referring to specific embodiments.

DESCRIPTION OF EMBODIMENTS

The technical solutions of the embodiments of the present disclosure will be clearly and completely described below with referring to the drawings in the embodiments of the present disclosure. Apparently, the described embodiments are only part of the embodiments of the present disclosure, rather than all of the embodiments. Based on the embodiments of the present disclosure, all other embodiments obtained by those of ordinary skilled in the art without inventive labor are within the protection scope of the present disclosure.

Figure 2:
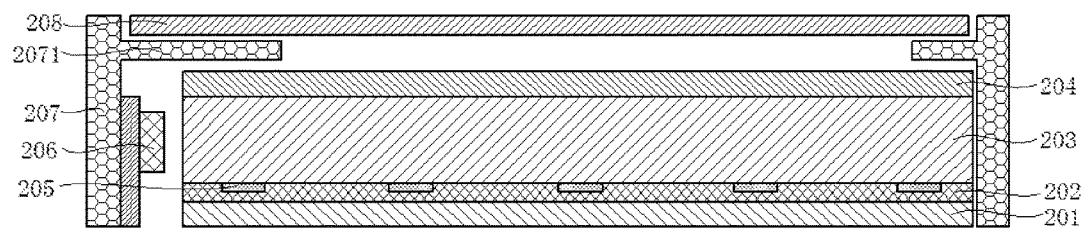
FIG. 2 is a structural diagram of another backlight module in the related art.

FIG. 1 is a structural diagram of a backlight module in the related art; and FIG. 2 is a structural diagram of another backlight module in the related art. As shown in FIG. 1, the liquid crystal display device includes a liquid crystal panel 105 and a backlight module, where the backlight module includes a middle frame 106, and the following components arranged in a stacked manner from bottom to top: a backplane 101, a reflector 102, a light guide panel 103 and an optical film 104. The backlight module further includes a light source 107 arranged opposite to the light entering side of the light guide panel 103. The middle frame 106 includes a supporting portion 1061 extending along aside where the light guide panel locates. The liquid crystal panel 105 is arranged above the supporting portion 1061. The backplane 101 is arranged at the bottom for supporting the liquid crystal panel 105 and the components of the backlight module. In the illustrated structure, the light guide panel and the reflector are separate structures, and dots are arranged on a side of the light guide panel facing towards the reflector, so that the light emitted from the light source is converted into a surface light source.

As shown in FIG. 2, the liquid crystal display device includes a liquid crystal panel 208 and a backlight module. The backlight module is arranged below the supporting portion 2071. The backlight module includes a middle frame 207 and the following components arranged in a stacked manner from bottom to top: a reflector 201, a light guide panel 203 and an optical film 204. Where the middle frame 207 includes a supporting portion 2071 extending along a side where the light guide panel locates, the liquid crystal panel 208 is arranged above the supporting portion 2071, a plurality of dots 205 are arranged at intervals on a side of the light guide panel 203 adjacent to the reflector 201, a glue layer 202 is arranged between the reflector 201 and the light guide panel 203, and the reflector 201 and the light guide panel 203 are arranged, by glue bonding, at the bottom to support the liquid crystal panel 208 and the backlight module.

A fixing manner of the reflector 201 and the light guide panel 203 is given in the related art shown in FIG. 2. The fixing manner is bonding. The bonding process maybe that the glue is coated on the entire bottom surface of the light guide panel 203 and then the reflector is pasted to the light guide panel.

Taking the dots printed in ink as an example, in the related art shown in FIG. 2, the glue layer covers the dots. In the technical solutions provided by the present disclosure, no glue is coated on the dots. Therefore, when light in the light guide panel enters the dots, in the related art, due to the glue layer 202 arranged between the reflector 201 and the light guide panel 203, when light emitted from the light source 206 enters into the light guide panel 203, the light refracted by the dots 205 on the light guide panel 203 needs to pass through the glue layer 202 before entering the reflector 201, and then passes through the dots 205 and enters the light guide panel 203 after being reflected by the reflector 201. During the process, the light passing through the glue layer 202 is absorbed by the glue.

The related arts above are information related to the present disclosure which are not necessarily prior art.

Figure 3:
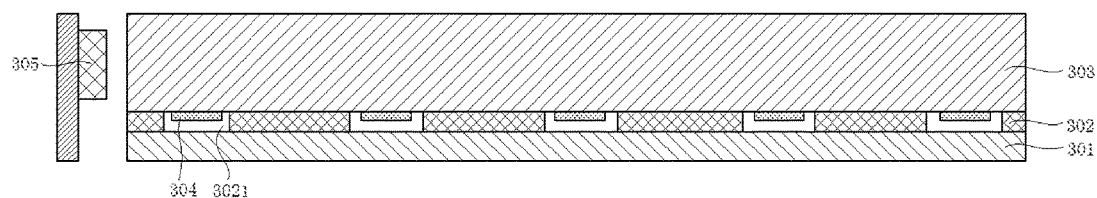
FIG. 3 is a structural diagram of a backlight module provided by some embodiments of the present disclosure.

FIG. 3 is a structural diagram of a backlight module provided by the present disclosure. The backlight module provided by some embodiments of the present disclosure includes a light source 305, a light guide panel 303, and a reflector 301. The light source 305 is arranged on a light entering side of the light guide panel 303, and the reflector 301 is arranged below the light guide panel 303. The bottom surface of the light guide panel 303 which is the side of the light guide panel 303 adjacent to the reflector 301 is arranged with dots 304 at intervals. The dots 304 are configured to disrupt total reflections of the light in the light guide panel 301. The glue layer 302 is provided between the reflector 301 and the light guide panel 303, and the glue layer 302 is provided with light transmission holes 3021 at positions of the dots 304.

The glue layer 302 between the reflector 301 and the light guide panel 303 is configured to bond the two together, and the glue layer 302 is provided around the dots and does not cover the dots, such as the light transmission holes are holes in the glue layer. In some embodiments, the reflector 301 and the light guide panel 303 bonded together are configured to replace the back plane in the related art to support the liquid crystal panel and the components of the backlight module, and the strength of the bonding combination of the reflector 301 and the light guide panel 303 is strong enough to support the components arranged thereon.

In some embodiments, the positions of part of the dots are provided with light transmission holes, and part of the dots are covered with glue.

In some embodiments, the dots are printed in ink. In some embodiments of the present disclosure, the dots are transparent or sim-transparent, and there are scattering particles in the dots. Due to the difference in refractive index between the materials of the dots and the light guide panel, part of the light enters the dots and is further reflected by the reflector. After the reflected light enters the light guide panel, uniform light may be formed when outputting from a light exiting surface of the light guide panel. In some embodiments, the dots may be grooves recessed from the bottom to an inside of the light guide panel. After the light inside the light guide panel encounters the grooves, paths of the light are changed. Thanks to the arrangement of the dots, uniform light may be formed when outputting from the light exiting surface of the light guide panel.

In some embodiments of the present disclosure, the light transmission holes 3021 are arranged on the glue layer 302 at the positions of the dots 304, thus the light from the light guide panel to the dots can be directly emitted from the dots to the reflector without passing through the glue layer. The light reflected by the reflector also passes through the dots directly and enters the light guide panel, so that there is no loss of light with the arrangement of the glue layer when fixing the reflector on the bottom surface of the light guide panel by the glue layer. There may be an air gap between the dots and the reflector, or the dots may be directly connected with the reflector. Shapes of the light transmission holes 3021 are not limited to the shapes of holes, they may also be of other light transmittance structures with other shapes, as long as the purpose of light transmittance is achieved. In addition, in terms of the size, the sizes of the light transmission holes 3021 may be greater than the sizes of the dots 304.

In some embodiments, the sizes of the light transmission holes 3021 on the glue layer 302 can be set to predetermined sizes so as to ensure that at least a part of the light refracted from the light guide panel 303 and, after being reflected by the reflector 301, at least a part of the light re-entering into the light guide panel 303 both pass through the light transmission holes directly without passing through the glue. The at least a part of light here may be most of the light, thus the loss of light may be further reduced by adjusting the sizes of the light transmission holes.

In some embodiments, the dots 304 maybe made of materials with higher refractive indexes so that most of the light refracted from the light guide panel 303 can directly enter the reflector 301, and after being reflected by the reflector 301, most of the light re-entering into the light guide 303 does not need to pass through the glue. For example, an ink composed of titanium dioxide ($TiO_2$) and silicon dioxide ($SiO_2$) crystals as well as resins may be adopted to manufacture the dots 304. The refractive index of the $TiO_2$ crystal is up to 2.62, so that the light exits to the dots 304 through the light guide panel 303 are refracted and reflected by the dots 304, and the refractions and reflections of the light are all concentrated in areas where the dots 304 are located, thereby effectively ensuring the loss of light after being refracted and reflected and improving the utilization rate of the light source.

Figure 4:
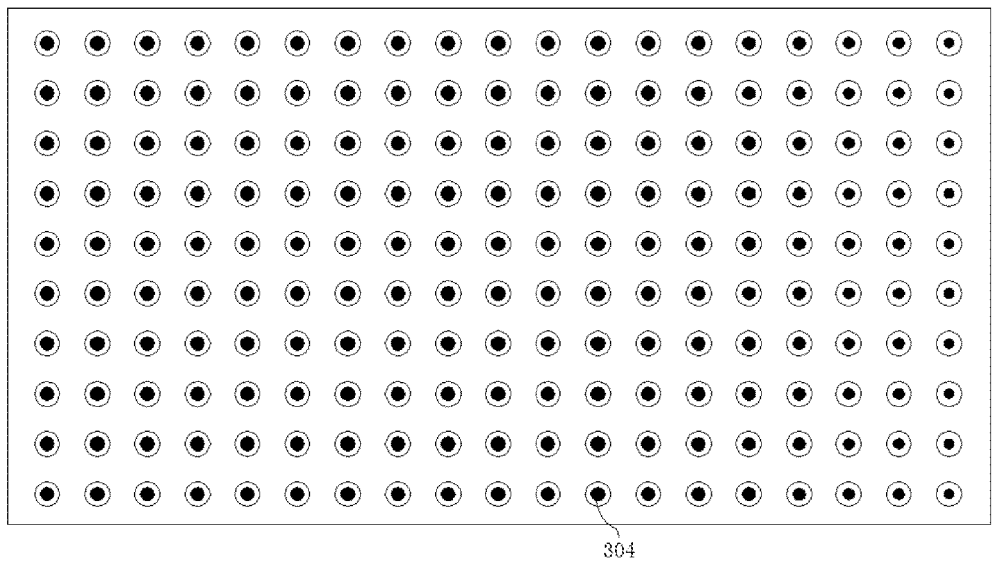
FIG. 4 is a structural diagram of dots on a light guide panel provided by some embodiments of the present disclosure.

In some embodiments, since the light source 305 is arranged on the light entering side of the light guide panel, the intensity of the light entering the region close to the light guide panel 303 is greater, and the intensity of light entering the region farther away from the light source 305 is less. In order to ensure that the intensity of light refracted and reflected by the dots 304 on the light guide panel 303 is uniform, when printing the dots 304, the dots 304 maybe larger in size when located farther away from the light source 305, as shown in FIG. 4.

In some embodiments, the plurality of dots 304 maybe uniformly arranged on the bottom surface of the light guide panel 303.

In some embodiments, in order to achieve the bonding effect of the glue layer 302 and ensure that the sizes of the light transmission holes 3021 on the glue layer 302 maybe large enough to prevent the printing dots 304 from being covered, the arrangement of the glue layer 302 and the dots 304 can be achieved by combining the glue layer 302 with screen printing and coating. For example, the arrangement may be implemented in two possible manners. In the first possible implementation, the bonding glue and the printing ink are arranged according to the arrangement of the glue layer 302 and the printing dots 304, (that is, the light transmission holes 3021 are provided in the glue layer at the positions of the printing dots 304), and both are together coated on a printing plate. During the printing, the bonding glue and the printing ink are both printed on the bottom surface of the light guide panel 303 under a certain pressure; in a second possible implementation, the printing of the printing dots 304 is firstly performed using a screen printing method, and then by way of coating, completing the coating of the glue layer 302 while keeping the printed printing dots 304 away from the glue. After the coating of the glue layer 302 is completed, the reflector 301 is bonded to the glue layer 302, thus not only completing the bonding of the light guide panel 303 and the reflector 301, but ensuring the separation of the printing dots 304 and the glue layer 302.

Figure 5:
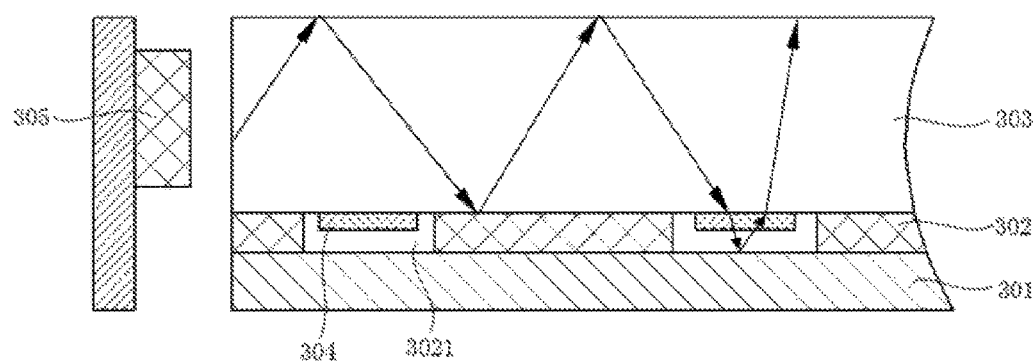
FIG. 5 is a schematic view of light propagation after a light source illuminates a light guide panel provided by some embodiments of the present disclosure.

According to FIG. 5, in the present disclosure, due to the bonding effect of the glue layer 302, on the basis of ensuring the fixed bonding of the light guide panel 303 and the reflector 301, the positions of the dots 304 in the glue layer are not provided with glue, where the dots 304 are arranged on the bottom surfaces of the light guide panel 301. That is, the light transmission holes 3021 are arranged on the glue layer at the positions of the dots 304 on the bottom surface of the light guide panel 303 such that the glue avoids the dots 304 on the light guide panel 303, that is, none of the positions of the dots 304 is covered by the glue. The lights entering the glue layer 302 are effectively reduced, such that, after light emitted from the light source 305 exits into the light guide panel 303, most of the light refracted to the reflector 301 through the dots 304, and most of the light reflected by the reflector 301 and re-entering into the light guide panel 303 both do not need to pass through the glue. Therefore the absorption of light by the glue is reduced and the utilization rate of the light source is improved.

Figure 6:
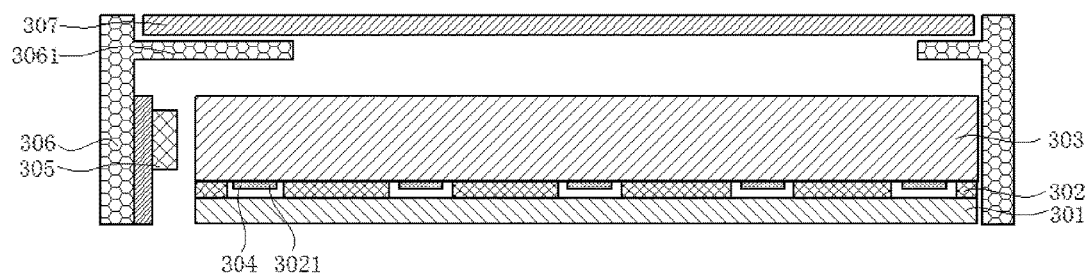
FIG. 6 is a structural diagram of a liquid crystal display device provided by some embodiments of the present disclosure.

As shown in FIG. 6, a liquid crystal display device is also provided in some embodiments of the present disclosure, which uses any of the above backlight modules. The backlight module includes a liquid crystal panel 307 and an edge-lit backlight module. The edge-lit backlight module is configured to illuminate the liquid crystal panel 307, the edge-lit backlight module includes a light source 305, a light guide panel 303 and a reflector 301, where the light source 305 is arranged on the light entering side of the light guide panel 303, the reflector 301 is arranged below the light guide panel 303, the bottom surface of the light guide panel 303 faces towards the reflector 301, and a plurality of dots 304 are arranged on the bottom surface at intervals. The reflector 301 is bonded to the bottom surface of the light guide panel 303 through the glue layer 302, and the glue layer 302 is provided with light transmission holes at positions of the dots 304. The edge-lit backlight module further includes a middle frame 306, where the middle frame 306 is provided with a supporting portion 3061 extending along a side where the light guide panel 303 locates, and the liquid crystal panel 307 is provided above the supporting portion 3061, the liquid crystal panel 307 and the reflector 301 are provided blew the supporting portion 3061.

Finally, it should be noted that each of the above embodiments is only used for illustrating the technical solutions of embodiments of the present disclosure, rather than limiting them; although the embodiments of the present disclosure are illustrated in detail with reference to each of the aforementioned embodiments, those ordinary skilled in the art should understand that: the technical solutions recorded in each of the aforementioned embodiments can still be amended, or part or all of the technical features can be substituted comparably; however, these modifications or substitutions do not make the essence of the corresponding technical solutions depart from the scope of the embodiment solutions of the present disclosure.

What is claimed is:

1. A liquid crystal display device, comprising: a light source, a light guide panel and a reflector, wherein the light source is arranged on a light entering side of the light guide panel, and the reflector is arranged below the light guide panel, wherein:
   a bottom of the light guide panel faces towards the reflector, and at least a first dot and a second dot are arranged on the bottom at intervals, the first dot being configured to guide a first light incident on the reflector from the light guide panel and the second dot being configured to guide a second light incident on the reflector from the light guide panel, and the reflector being configured to reflect the first light and the second light back to the light guide panel;
   a glue layer is provided between the first dot and the second dot, and is configured to bound the reflector and the bottom of the light guide panel together; and
   wherein there is no glue layer between the first dot and the reflector, and an interface where the glue layer is attached with the bottom of the light guide panel is configured to reflect a third light traveling in the light guide panel.

2. The liquid crystal display device according to claim 1, the first dot and the second dot are composed by mixing titanium dioxide (TiO2) and silicon dioxide (SiO2) crystals with resins.

3. The liquid crystal display device according to claim 1, the first dot and the second dot are larger in size when located farther away from the light source.

4. The liquid crystal display device according to claim 1, the glue layer is printed on the bottom surface of the light guide panel by way of screen printing.

5. The liquid crystal display device according to claim 1, the glue layer is coated on the bottom of the light guide panel by way of coating.

6. The liquid crystal display device module according to claim 1, the first dot and the second dot are transparent or sim-transparent, and there are scattering particles in the first dot and the second dot.

7. The liquid crystal display device according to claim 1, the glue layer is arranged around at least one of the first dot and the second dot, and a light transmission hole is formed by the glue layer at a position of at least one of the first dot and the second dot.

8. The liquid crystal display device according to claim 7, sizes of the light transmission holes are larger than a size of the first dot or a size of the second dot.

9. The liquid crystal display device according to claim 7, the sizes of the light transmission holes are predetermined, so that both at least a part of light passing through the dots and exiting to the reflector and at least a part of light reflected by the reflector and re-entering into the light guide panel pass through the light transmission holes.

10. The liquid crystal display device according to claim 7, the light transmission holes are holes in the glue layer.

11. The liquid crystal display device according to claim 1, there is a gap between the first dot and the reflector.

12. The liquid crystal display device according to claim 11, sizes of the light transmission holes are larger than a size of the first dot or a size of the second dot.

13. The liquid crystal display device according to claim 11, the sizes of the light transmission holes are predetermined, so that both at least a part of light passing through the dots and exiting to the reflector and at least a part of light reflected by the reflector and re-entering into the light guide panel pass through the light transmission holes.

14. A liquid crystal display device, comprising: a liquid crystal panel and an edge-lit backlight module, and the edge-lit backlight module is configured to illuminate the liquid crystal panel;

the edge-lit backlight module comprises a light source, a light guide panel and a reflector, wherein the light source is arranged on a light entering side of the light guide panel, and the reflector is arranged below the light guide panel, a bottom of the light guide panel faces towards the reflector, and at least a first dot and a second dot are arranged on the bottom at intervals, the first dot being configured to guide a first light incident on the reflector from the light guide panel and the second dot being configured to guide a second light incident on the reflector from the light guide panel;

the reflector being configured to reflect the first light and the second light back to the light guide panel;

a glue layer is provided between the first dot and the second dot, and is configured to bound the reflector and the bottom of the light guide panel together; and wherein there is no glue layer between the first dot and the reflector, and an interface where the glue layer is attached with the bottom of the light guide panel is configured to reflect a third light traveling in the light guide panel.

15. The liquid crystal display device according to claim 14, the edge-lit backlight module further comprises a middle frame which is provided with a supporting portion and a base, the supporting portion extends away from the base, the liquid crystal panel is provided above the supporting portion, and the light guide panel and the reflector are provided below the supporting portion.

16. The liquid crystal display device according to claim 15, the light source is arranged on the base and facing a light entering surface of the light guide panel.

17. The liquid crystal display device according to claim 14, the first dot and the second dot are transparent or sim-transparent, and there are scattering particles in the first dot and the second dot.

18. The liquid crystal display device according to claim 14, the light transmission holes are holes in the glue layer.

19. The liquid crystal display device according to claim 14, the glue layer is arranged around at least one of the first dot and the second dot, and a light transmission hole is formed by the glue layer at a position of at least one of the first dot and the second dot.

* * * * *